United States Patent
Chan et al.

(10) Patent No.: US 11,418,756 B2
(45) Date of Patent: Aug. 16, 2022

(54) SIGNAL ENHANCEMENT RELAY APPARATUS AND METHOD

(71) Applicant: REALTEK SEMICONDUCTOR CORPORATION, Hsinchu (TW)

(72) Inventors: Chun-Chieh Chan, Hsinchu (TW); Chia-Hao Chang, Hsinchu (TW); Tai-Jung Wu, Hsinchu (TW); Ming-An Wu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/314,080

(22) Filed: May 7, 2021

(65) Prior Publication Data
US 2021/0409642 A1 Dec. 30, 2021

(30) Foreign Application Priority Data
Jun. 24, 2020 (TW) .................................. 109121594

(51) Int. Cl.
*H04N 7/015* (2006.01)
*H04N 7/01* (2006.01)

(52) U.S. Cl.
CPC ........... *H04N 7/015* (2013.01); *H04N 7/0125* (2013.01)

(58) Field of Classification Search
CPC .. H04N 7/015; H04N 7/0125; G09G 2370/12; G09G 5/006
See application file for complete search history.

(56) References Cited

U.S. PATENT DOCUMENTS 9,270,922 B2   2/2016 Kabuto
9,473,678 B2  10/2016 Glen
(Continued)

FOREIGN PATENT DOCUMENTS

CN   101971616 A   2/2011
CN   102740034 A  10/2012

OTHER PUBLICATIONS

OA letter of the counterpart TW application (appl. no. 109121594) mailed on Jun. 30, 2021. Summary of the OA letter: 1. Claims 1 and 10 are rejected as being unpatentable over the disclosure of the cited reference 1 (CN 102740034A) and the cited reference 2 (CN101971616A). 2. Claims 2~9 are allowable.

*Primary Examiner* — Michael Lee
(74) *Attorney, Agent, or Firm* — WPAT, PC

(57) ABSTRACT

The present invention discloses a signal enhancement relay apparatus is provided. A display data channel stretching circuit includes a direct and an indirect channels. A snooper circuit is disposed at the direct channel. The indirect channel includes a master and a slave paths having a master and a slave transmission circuits disposed thereon. The direct channel is selected under a default passive mode such that a snooper link bridging handler circuit is enabled to monitor a display data transmission on the direct path through the snooper circuit, to perform a channel link bridging process corresponding to a data enhancement transmission channel accordingly. When the channel link bridging process under the passive mode fails, the indirect channel is selected under an active mode such that a intervening link bridging handler circuit t is enabled to access the display data transmission on the master and the slave paths respectively through the master and the slave transmission circuits, to perform the channel link bridging process respectively.

18 Claims, 4 Drawing Sheets

(56) References Cited

U.S. PATENT DOCUMENTS

| | | | |
|---|---|---|---|
| 2009/0279473 A1* | 11/2009 | Lu | G09G 5/12 |
| | | | 370/329 |
| 2012/0079162 A1* | 3/2012 | Jaramillo | G09G 5/12 |
| | | | 710/316 |
| 2013/0010168 A1* | 1/2013 | Pourbigharaz | G09G 5/39 |
| | | | 348/E5.022 |
| 2013/0212613 A1* | 8/2013 | Velasco | H04N 21/43635 |
| | | | 725/25 |
| 2015/0020088 A1* | 1/2015 | Velasco | H04L 12/2838 |
| | | | 725/116 |
| 2017/0194722 A1* | 7/2017 | Naganishi | H01R 4/64 |
| 2017/0257273 A1* | 9/2017 | Li | H04L 43/08 |
| 2018/0131142 A1* | 5/2018 | Satheesh | H01R 13/7175 |
| 2018/0191523 A1* | 7/2018 | Shah | H04B 3/36 |

* cited by examiner

SIGNAL ENHANCEMENT RELAY APPARATUS AND METHOD

BACKGROUND OF THE INVENTION

1. Field of the Invention

The present invention relates to a signal enhancement relay apparatus and a signal enhancement relay method.

2. Description of Related Art

Due to the trend of high-quality digital image requirements, image data needs to be transmitted by using a mechanism having higher speed and larger bandwidth. High definition multimedia interface (HDMI) thus becomes a widely adapted interface currently. Especially, HDMI 2.1 that has a high speed transmission bandwidth of 12 Gbps and is able to support up to 10K high resolution images gradually becomes mainstream.

In order to extend the transmission distance and stabilize the signal quality, a relay apparatus, e.g. redriver or retimer, can be used to enhance data. In order to operation the relay apparatus, a bridging technology is required to link terminal apparatus to be relayed. However, the current bridging technology is not efficient and the connection may not be successfully established due to the wire having a low quality or the delayed response between the relay apparatus and the terminal apparatus.

SUMMARY OF THE INVENTION

In consideration of the problem of the prior art, an object of the present invention is to provide a signal enhancement relay apparatus and a signal enhancement relay method.

The present invention discloses a signal enhancement relay apparatus configured to link a display receiving apparatus and a display transmitting apparatus. The signal enhancement relay apparatus includes a display data channel stretching circuit, a data enhancement transmission channel, a snooping link bridging handler circuit and an intervening link bridging handler circuit. The display data channel stretching circuit includes a direct channel and an indirect channel. The direct channel includes a direct path and a snooper circuit electrically coupled to the direct path. The indirect channel includes a master path having a master transmission circuit disposed thereon and a slave path having a slave transmission circuit disposed thereon. The snooping link bridging handler circuit is electrically coupled to the snooper circuit. The intervening link bridging handler circuit is electrically coupled to the master transmission circuit and the slave transmission circuit. The direct channel is selected under a default passive mode, such that the direct path is directly electrically coupled to the display receiving apparatus and the display transmitting apparatus, and the snooping link bridging handler circuit is enabled to monitor a display data transmission on the direct path through the snooper circuit, so as to perform a channel link bridging process corresponding to a data enhancement transmission channel accordingly. When the channel link bridging process under the passive mode fails, the indirect channel is selected under an active mode, such that the master path and the slave path are respectively electrically coupled to the display receiving apparatus and the display transmitting apparatus, and the intervening link bridging handler circuit is enabled to access the display data transmission on the master path and the slave path respectively through the master transmission circuit and the slave transmission circuit, so as to perform the channel link bridging process.

The present invention also discloses a signal enhancement relay method used in a signal enhancement relay apparatus, wherein the signal enhancement relay apparatus is configured to link a display receiving apparatus and a display transmitting apparatus, the signal enhancement relay method includes the steps outlined below. A direct channel of a display data channel stretching circuit is selected to be electrically coupled to the display receiving apparatus and the display transmitting apparatus under a default passive mode, wherein the direct channel includes a direct path directly electrically coupled to the display receiving apparatus and the display transmitting apparatus and a snooper circuit electrically coupled to the direct path. A snooping link bridging handler circuit electrically coupled to the snooper circuit is enabled under the passive mode, to monitor a display data transmission on the direct path through the snooper circuit, so as to perform a channel link bridging process corresponding to a data enhancement transmission channel accordingly. Whether the channel link bridging process under the passive mode fails is determined. An indirect channel of the display data channel stretching circuit is selected to be electrically coupled to the display receiving apparatus and the display transmitting apparatus under an active mode when the channel link bridging process under the passive mode fails, wherein the indirect channel includes a master path electrically coupled to the display receiving apparatus and having a master transmission circuit disposed thereon, and a slave path electrically coupled to the display transmitting apparatus and having a slave transmission circuit disposed thereon. An intervening link bridging handler circuit electrically coupled to the master transmission circuit and the slave transmission circuit is enabled under the active mode, to access the display data transmission on the master path and the slave path respectively through the master transmission circuit and the slave transmission circuit, so as to perform the channel link bridging process.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

An aspect of the present invention is to provide a signal enhancement relay apparatus and a signal enhancement relay method to quickly perform the link training process under the passive mode and perform independent link training process on the display transmitting apparatus and the display receiving apparatus respectively under the active mode when the link training process under the passive mode fails. The possibility of the success of the link training process is increased.

Figure 1:
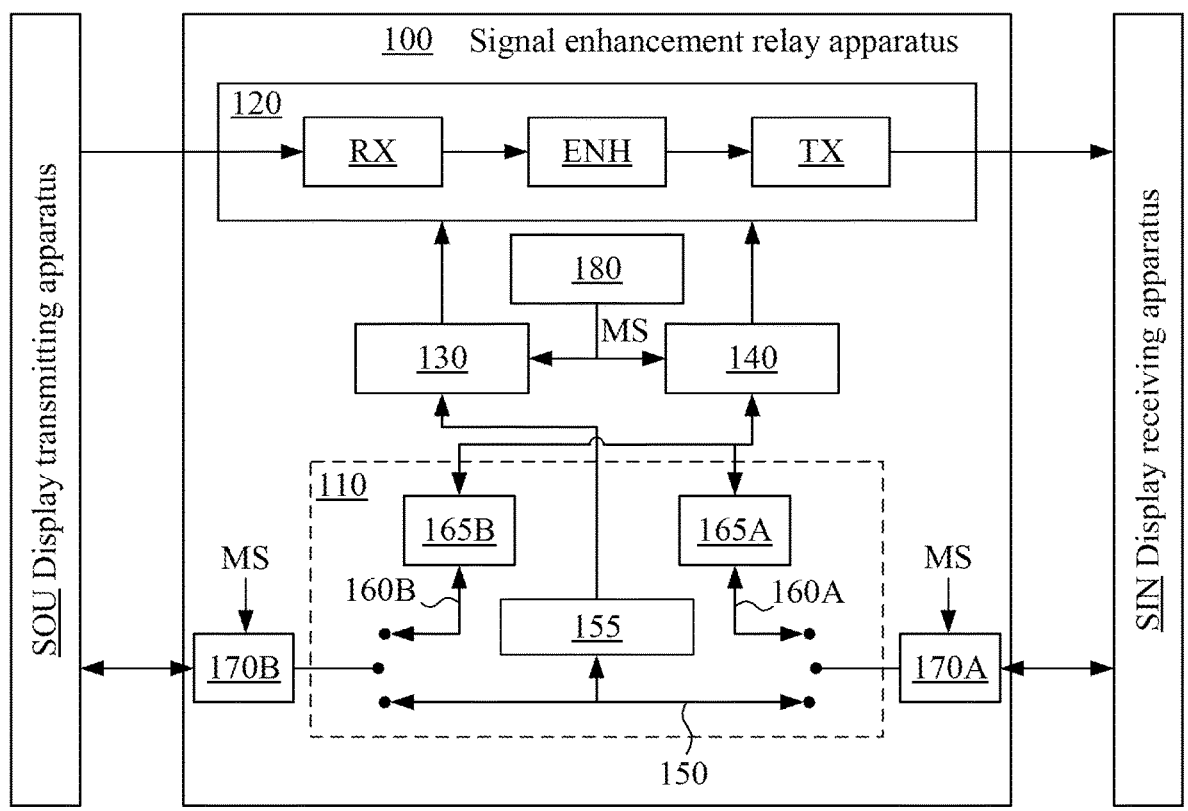
FIG. 1 illustrates a block diagram of a signal enhancement relay apparatus according to an embodiment of the present invention.

Reference is now made to FIG. 1. FIG. 1 illustrates a block diagram of a signal enhancement relay apparatus 100 according to an embodiment of the present invention.

In an embodiment, the signal enhancement relay apparatus 100 is electrically coupled between the display receiving apparatus SIN and the display transmitting apparatus SOU to link the display receiving apparatus SIN and the display transmitting apparatus SOU. Further, the signal enhancement relay apparatus 100 is configure to perform enhancement on the image data transmitted from the display transmitting apparatus SOU through the signal enhancement relay apparatus 100 to the display receiving apparatus SIN.

In an embodiment, the display receiving apparatus SIN and the display transmitting apparatus SOU perform image data transmission according to the format of high definition multimedia interface (HDMI). Based on different enhancement methods, the signal enhancement relay apparatus 100 can be implemented by such as, but not limited to a redriver circuit or a retimer circuit.

The signal enhancement relay apparatus 100 includes a display data channel stretching circuit 110, a data enhancement transmission channel 120, a snooping link bridging handler circuit 130 and an intervening link bridging handler circuit 140.

The display data channel stretching circuit 110 establishes a display data channel (DDC) to perform display data transmission through such as, but not limited to I²C interface, to exchange the message and status between the display receiving apparatus SIN and the display transmitting apparatus SOU. In an embodiment, the display data channel stretching circuit 110 includes a direct channel and an indirect channel.

The direct channel includes a direct path 150 and a snooper circuit 155. The direct path 150 is a connection path to perform display data transmission. The snooper circuit 155 is electrically coupled to the direct path 150 to monitor the display data transmission performed on the direct path 150.

The snooping link bridging handler circuit 130 is electrically coupled to the snooper circuit 155. In an embodiment, when the signal enhancement relay apparatus 100 operates under a passive mode, the snooping link bridging handler circuit 130 is enabled to perform monitoring according to the snooper circuit 155 and perform the channel link bridging process corresponding to the data enhancement transmission channel 120.

The indirect channel includes a master path 160A and a slave path 160B independent to each other. The master path 160A has a master transmission circuit 165A disposed thereon. The slave path 160B has a slave transmission circuit 165B disposed thereon.

The intervening link bridging handler circuit 140 is electrically coupled between the master transmission circuit 165A and the slave transmission circuit 165B. In an embodiment, when the signal enhancement relay apparatus 100 operates under an active mode, the intervening link bridging handler circuit 140 is enabled to access the display data transmission on the master path 160A and the slave path 160B respectively to perform the channel link bridging process corresponding to the data enhancement transmission channel 120.

The data enhancement transmission channel 120 includes a receiving circuit RX, a transmitting circuit TX and a data enhancement circuit ENH.

The receiving circuit RX and the display transmitting apparatus SOU are electrically coupled. The transmitting circuit TX and the display receiving apparatus SIN are electrically coupled. The data enhancement circuit ENH performs enhancement on the data transmitted between the receiving circuit RX and the transmitting circuit TX after the channel link bridging process is finished. More specifically, after the channel link bridging process is finished, the data enhancement transmission channel 120 establishes such as, but not limited to a fixed rate link (FRL), to receive image data from the display transmitting apparatus SOU through the receiving circuit RX, perform enhancement on the image data in the data enhancement circuit ENH and transmit the image data to the display receiving apparatus SIN through the transmitting circuit TX.

In order to allow the display data channel stretching circuit 110, the snooping link bridging handler circuit 130, and the intervening link bridging handler circuit 140 described above to switch between the passive mode and the active mode, the signal enhancement relay apparatus 100 may selectively include a first selection circuit 170A, a second selection circuit 170B and a mode switching circuit 180.

The first selection circuit 170A selects the direct channel 150 to be electrically coupled to the display receiving apparatus SIN through the direct path 150 under the passive mode, and selects the indirect channel to be electrically coupled to the display receiving apparatus SIN through the master path 160A under the active mode.

The second selection circuit 170B selects the direct channel 150 to be electrically coupled to the display transmitting apparatus SOU through the direct path 150 under the passive mode, and selects the indirect channel to be electrically coupled to the display transmitting apparatus SOU through the slave path 160B under the active mode.

The mode switching circuit 180 generates a mode switching signal MS, such that the snooping link bridging handler circuit 130, the intervening link bridging handler circuit 140, the first selection circuit 170A and the second selection circuit 170B operates under one of the passive mode and the active mode.

The operation and the switching mechanism under the passive mode and the active mode are described in detail in the following paragraphs.

Figure 2A:
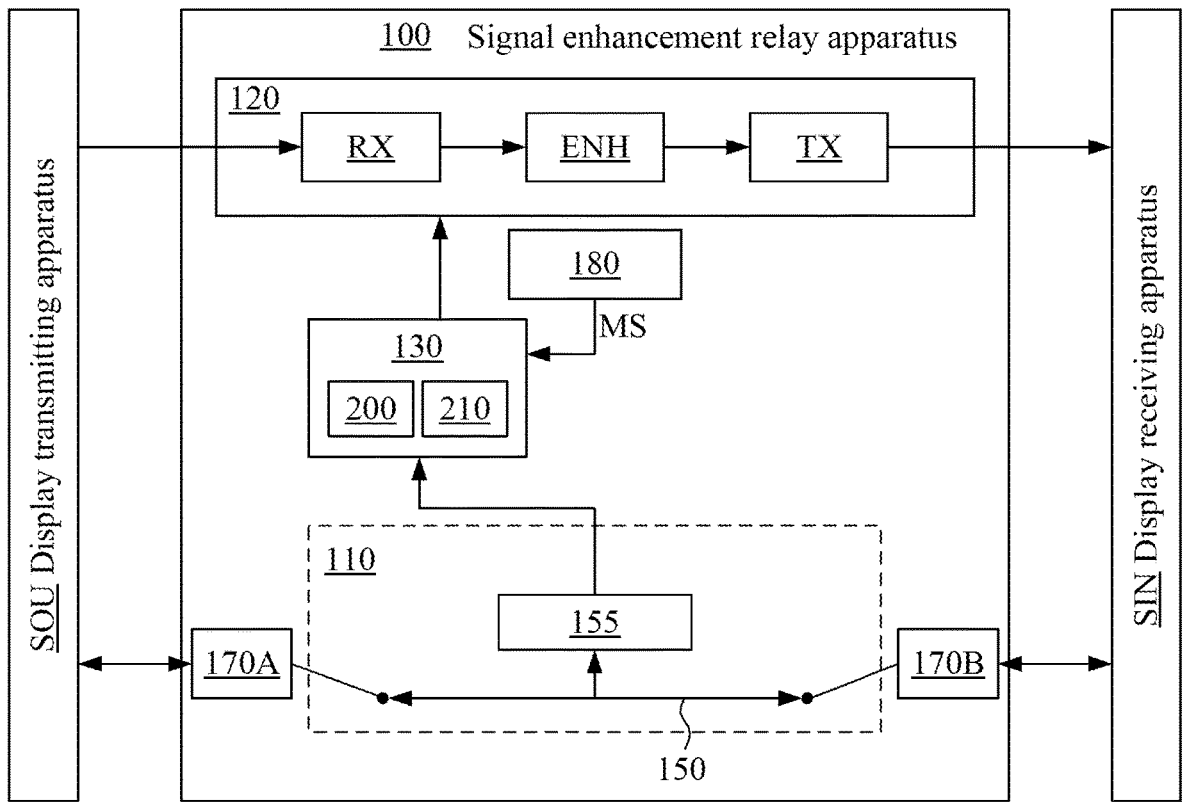
FIG. 2A illustrates a simplified block diagram of the signal enhancement relay apparatus under the passive mode according to an embodiment of the present invention.

Reference is now made to FIG. 2A. FIG. 2A illustrates a simplified block diagram of the signal enhancement relay apparatus 100 under the passive mode according to an embodiment of the present invention. More specifically, FIG. 2A illustrates only the circuits that are active under the passive mode.

In an embodiment, the mode switching circuit 180 is predetermined to operate the signal enhancement relay apparatus 100 under the passive mode.

The mode switching circuit 180 generates the mode switching signal MS having a first status, to control the first selection circuit 170A and the second selection circuit 170B to select the direct channel to be electrically coupled to the display receiving apparatus SIN and the display transmitting apparatus SOU through the direct path 150. The display receiving apparatus SIN and the display transmitting apparatus SOU can perform display data transmission through the direct path 150.

Further, the mode switching signal MS having the first status enables the snooping link bridging handler circuit 130 to monitor display data transmission on the direct path 150 through the snooper circuit 155, to perform a channel link bridging process. In an embodiment, the channel link bridging process includes a link training process and an authentication handshake process.

In an embodiment, the snooping link bridging handler circuit 130 includes a link bridging control circuit 200 and an authentication monitoring circuit 210.

The link bridging control circuit 200 monitors the display data transmission on the direct path 150 through the snooper circuit 155, to control the receiving circuit RX and the transmitting circuit TX to perform a link training process respectively with the display transmitting apparatus SOU and the display receiving apparatus SIN.

In an embodiment, the link training process can begin with the transmission of extended display identification data (EDID) information of the display receiving apparatus SIN by itself through the direct path 150 to inform the display transmitting apparatus SOU the transmission ability that the display receiving apparatus SIN supports. The display transmitting apparatus SOU transmits a link request corresponding to a transmission mode that matches the transmission ability of the display receiving apparatus SIN through the direct path 150.

The display receiving apparatus SIN transmits a training pattern to the display transmitting apparatus SOU through the direct path 150. Based on the training pattern, the display transmitting apparatus SOU transmits test data to the display receiving apparatus SIN through the data enhancement transmission channel 120. The display receiving apparatus SIN determines that whether the received test data matches the training pattern. When the received test data matches the training pattern, the link training process is determined to be successful.

On the other hand, the authentication monitoring circuit 210 monitors the authentication status according to the display data transmission such that the link bridging control circuit 200 determines whether the authentication handshaking process is finished according to the authentication status.

In an embodiment, the authentication handshaking process can be performed by the key authorization and the exchange of the digital image protection encoding/decoding status between the display receiving apparatus SIN and the display transmitting apparatus SOU. In an embodiment, the authentication handshaking process is high-bandwidth digital content protection (HDCP) authentication process.

When the link training process and the authentication handshaking process are performing, the snooping link bridging handler circuit 130 keeps monitoring the display data transmission on the direct path 150 and controls the data enhancement transmission channel 120 to operate when necessary.

It is appreciated that, the method and the content of the performance of the link training process and the authentication handshaking process described above is merely an example. In other embodiments, the link training process and the authentication handshaking process may include different contents and may be performed by using other methods. Further, the channel link bridging process may include other processes. The present invention is not limited thereto.

However, the channel link bridging process may fail due to different reasons. In an embodiment, when one of the link training process and the authentication handshaking process fails, the channel link bridging process is determined to be failed.

Taking the link training process as an example, when the link training process is not finished within a predetermined time, the link training process is determined to be failed. On the other hand, when the link training process is finished at a negotiated mode having a negotiated speed lower than a speed of a supported mode of the display receiving apparatus SIN (e.g. the display receiving apparatus SIN is able to support HDMI 2.1 FRL but the negotiated mode is HDMI 2.0 TMDS), the link training process is determined to be failed.

Taking the authentication handshaking process as an example, when the authentication handshaking process is not finished within a predetermined time, or when a key authentication fails, the authentication handshaking process is determined to be failed.

Figure 2B:
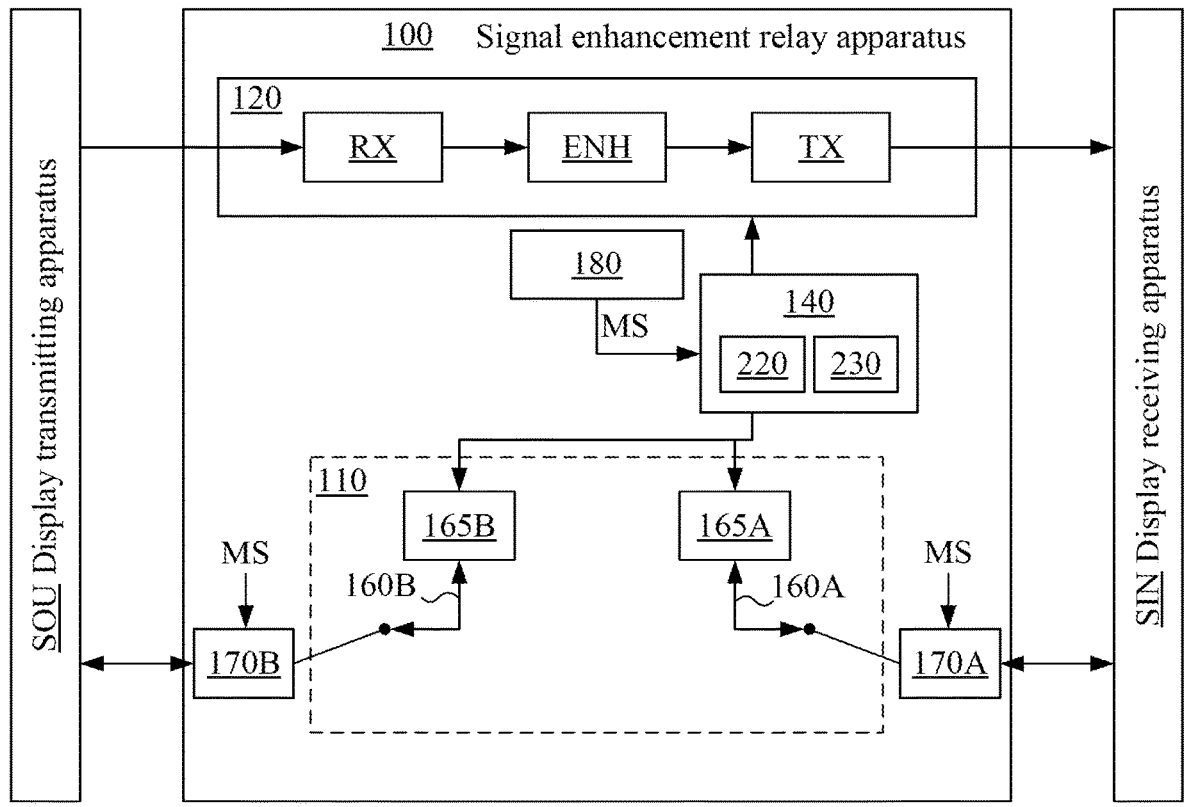
FIG. 2B illustrates a simplified block diagram of the signal enhancement relay apparatus under the active mode according to an embodiment of the present invention.

Reference is now made to FIG. 2B. FIG. 2B illustrates a simplified block diagram of the signal enhancement relay apparatus 100 under the active mode according to an embodiment of the present invention. More specifically, FIG. 2B illustrates only the circuits that are active under the active mode.

In an embodiment, the mode switching circuit 180 operates the signal enhancement relay apparatus 100 under the active mode when the channel link bridging process fails under the passive mode.

The mode switching circuit 180 generates the mode switching signal MS having the second status, such that the first selection circuit 170A and the second selection circuit 170B select the indirect channel to be electrically coupled to the display receiving apparatus SIN and the display transmitting apparatus SOU respectively through the master path 160A and the slave path 160B.

Furthermore, the mode switching signal MS having the second status enables the intervening link bridging handler circuit 140, to access the display data transmission on the master path 160A and the slave path 160B respectively through the master transmission circuit 165A and the slave transmission circuit 165B to perform the channel link bridging process. Likewise, the channel link bridging process includes the link training process and the authentication handshaking process. Furthermore, the signal enhancement relay apparatus 100 operates under the active mode to allow the intervening link bridging handler circuit 140 to respectively access the display data transmission through the master transmission circuit and the slave transmission circuit on the master path and the slave path, to further respectively perform the channel link bridging process corresponding to the data enhancement transmission channel with the terminal apparatus.

In an embodiment, the intervening link bridging handler circuit 140 includes a link coordination circuit 220 and an authentication synchronization circuit 230.

The link coordination circuit 220 accesses the display data transmission on the slave path 160B and the master path 160A respectively through the slave transmission circuit 165B and the master transmission circuit 165A to perform the link training process.

In an embodiment, the link training process at least includes one of the following processes. Firstly, link speeds respectively negotiated with the display transmitting apparatus SOU and the display receiving apparatus SIN are coordinated. Secondly, a feed-forward equalizer parameter of the transmitting circuit TX is adjusted. Thirdly, a request is transmitted to a display transmitting circuit (not illustrated) of the display transmitting apparatus SOU to adjust a display transmitting feed-forward equalizer parameter of the display transmitting circuit.

More specifically, when the link speed negotiated with the display transmitting apparatus SOU is too low, the link coordination circuit 220 can actively force the master transmission circuit 165A to update to a lower link speed, to further decrease the link speed of the display receiving apparatus SIN. On the contrary, when the link speed negotiated with the display receiving apparatus SIN is too low, the link coordination circuit 220 can actively force the slave transmission circuit 165B to deliver a request to decrease the link speed, to further decrease the link speed of the display transmitting apparatus SOU.

In an embodiment, when the transmission quality of the signal wire between the signal enhancement relay apparatus 100 and the display receiving apparatus SIN is not ideal, the transmitting circuit TX may receive a request to adjust the feed-forward equalizer (FFB) parameter from the display receiving apparatus SIN. The transmitting circuit TX can adjust the feed-forward equalizer parameter to increase the amount of power compensation to improve the signal quality.

Similarly, when the matching of the training pattern performed by the receiving circuit RX fails, the receiving circuit RX may request the display transmitting apparatus SOU to adjust the feed-forward equalizer parameter to increase the channel compensation to increase the possibility of the success of the linking. As a result, under the condition that the channel loss or the wire length is the same, the effect of the low quality of the wire on the signal quality can be decreased to obtain better equipment compatibility.

On the other hand, the authentication synchronization circuit 230 accesses the display data transmission on the slave path 160B and the master path 160A respectively through the slave transmission circuit 165B and the master transmission circuit 165A, to perform the authentication handshaking process with the display transmitting apparatus SOU and the display receiving apparatus SIN synchronously.

In an embodiment, when the channel link bridging process is determined to be failed since one of the link training process and the authentication handshaking process fails, the display transmitting apparatus SOU and the display receiving apparatus SIN can not perform fixed rate linking (FRL) data transmission through the signal enhancement relay apparatus 100. Further, the display receiving apparatus SIN may not be able to decode the data from the data enhancement transmission channel.

As a result, the signal enhancement relay apparatus 100 of the present invention can perform quick link training process and monitor the status of the authentication process under the passive mode, and switch to the active mode when the channel link bridging process under the passive mode. Under the active mode, though the channel link bridging process is slower, the bridging process can be adjusted independently on the display transmitting apparatus SOU and the display receiving apparatus SIN. Such a mechanism can finish the channel linking quickly under the passive mode and increase the possibility of the success of the channel linking under the active mode when the channel link bridging process fails under the passive mode.

Figure 3:
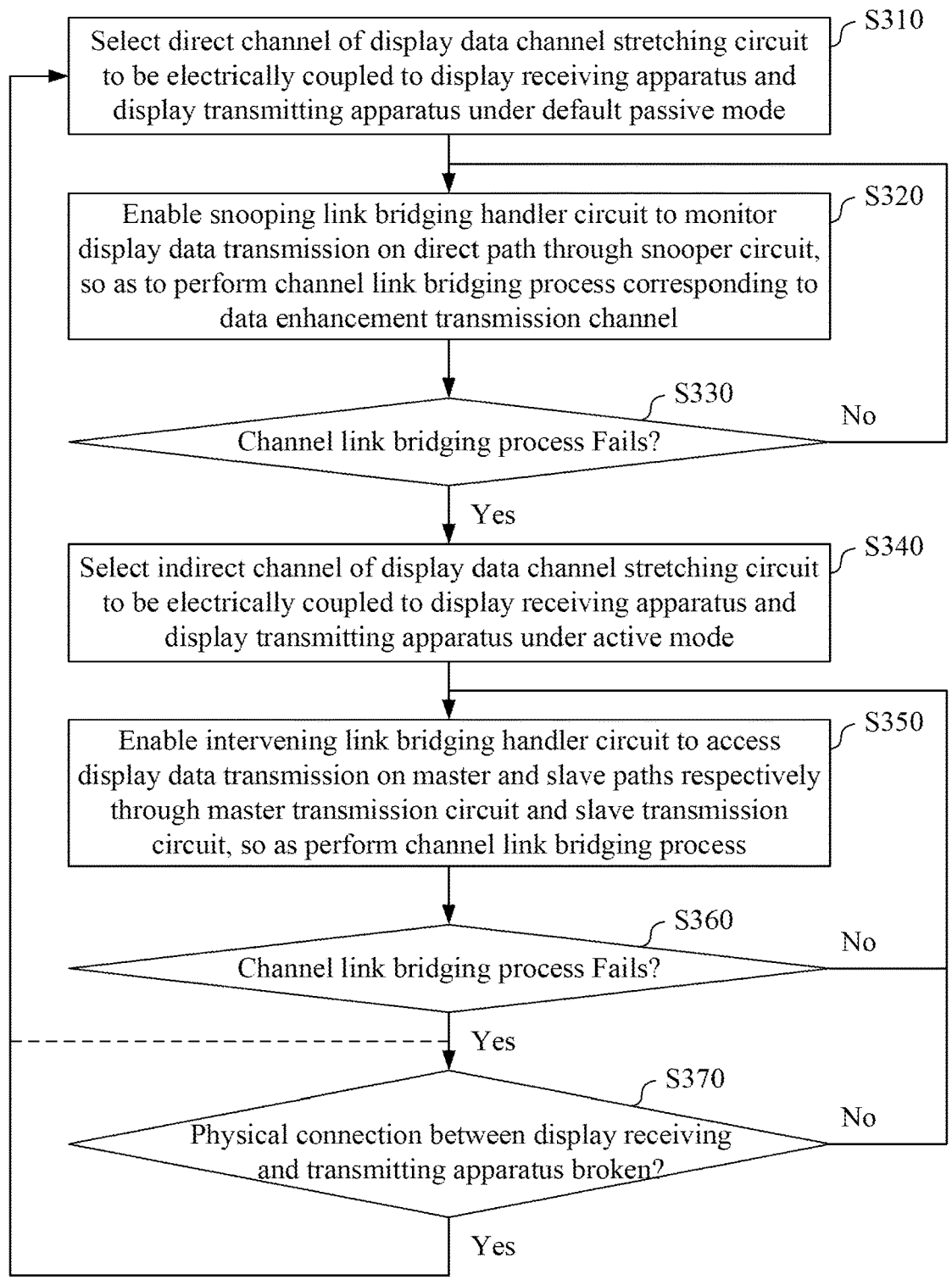
FIG. 3 illustrates a flow chart of a signal enhancement relay method according to an embodiment of the present invention.

Reference is now made to FIG. 3. FIG. 3 illustrates a flow chart of a signal enhancement relay method 300 according to an embodiment of the present invention.

Besides the apparatus described above, the present invention further discloses the signal enhancement relay method 300 that can be used in such as, but not limited to the signal enhancement relay apparatus 100 illustrated in FIG. 1. An embodiment of the signal enhancement relay method 300 is illustrated in FIG. 3 and includes the steps outlined below.

In step S310, the direct channel of the display data channel stretching circuit 110 is selected to be electrically coupled to the display receiving apparatus SIN and the display transmitting apparatus SOU under the default passive mode.

The direct channel includes the direct path 150 directly electrically coupled to the display receiving apparatus SIN and the display transmitting apparatus SOU and the snooper circuit 155 electrically coupled to the direct path 150.

In step S320, the snooping link bridging handler circuit 130 electrically coupled to the snooper circuit 155 is enabled under the passive mode, to monitor the display data transmission on the direct path 150 through the snooper circuit 155, so as to perform the channel link bridging process corresponding to the data enhancement transmission channel 120 accordingly.

In step S330, whether the channel link bridging process under the passive mode fails is determined.

When the channel link bridging process under the passive mode is not determined to be failed, the flow goes back to the step S320 to keep operating under the passive mode.

In step S340, when the channel link bridging process under the passive mode fails, the indirect channel of the display data channel stretching circuit 110 is selected to be electrically coupled to the display receiving apparatus SIN and the display transmitting apparatus SOU under the active mode.

The indirect channel includes the master path 160A electrically coupled to the display receiving apparatus SIN and having the master transmission circuit 165A disposed thereon, and the slave path 160B electrically coupled to the display transmitting apparatus SOU and having the slave transmission circuit 165B disposed thereon.

In step S350, the intervening link bridging handler circuit 140 electrically coupled to the master transmission circuit 165A and the slave transmission circuit 165B is enabled under the active mode, to access the display data transmission on the master path 160A and the slave path 160B respectively through the master transmission circuit 165A and the slave transmission circuit 165B, so as to perform the channel link bridging process.

In step S360, whether the channel link bridging process fails under the active mode is determined.

When the channel link bridging process under the active mode is not determined to be failed, the flow goes back to the step S350 to keep operating under the active mode.

In an embodiment, when the channel link bridging process under the active mode is determined to be failed, the flow can selectively go back to the step S310 to operate the signal enhancement relay apparatus 100 under the default passive mode again. In another embodiment, when the channel link bridging process under the active mode is determined to be failed, the flow can selectively determine whether the physical connection between the display receiving apparatus SIN and the display transmitting apparatus SOU are broken in the step S370. When the physical connection between the display receiving apparatus SIN and the display transmitting apparatus SOU are not broken, the signal enhancement relay apparatus 100 may be kept under the active mode and the flow goes back to the step S350 to keep performing the channel link bridging process. When the physical connection between the display receiving apparatus SIN and the display transmitting apparatus SOU are broken, the signal enhancement relay apparatus 100 stops to operate under the active mode, and the flow goes back to the step S310.

It is appreciated that the embodiments described above are merely an example. In other embodiments, it should be appreciated that many modifications and changes may be made by those of ordinary skill in the art without departing, from the spirit of the invention.

In summary, the signal enhancement relay apparatus and the signal enhancement relay method of the present invention can perform the link training process quickly under the passive mode. When the link training process fails under the passive mode, the link training process that can adjust the display transmitting apparatus SOU and the display receiving apparatus SIN independently can be performed under the active mode. The possibility of the success of the channel linking can be increased.

The aforementioned descriptions represent merely the preferred embodiments of the present invention, without any intention to limit the scope of the present invention thereto. Various equivalent changes, alterations, or modifications based on the claims of present invention are all consequently viewed as being embraced by the scope of the present invention.

What is claimed is:

1. A signal enhancement relay apparatus, configured to link a display receiving apparatus and a display transmitting apparatus, the signal enhancement relay apparatus comprising:
   a display data channel stretching circuit comprising:
      a direct channel comprising a direct path and a snooper circuit electrically coupled to the direct path; and
      an indirect channel comprising a master path having a master transmission circuit disposed thereon and a slave path having a slave transmission circuit disposed thereon;
   a data enhancement transmission channel;
   a snooping link bridging handler circuit electrically coupled to the snooper circuit; and
   an intervening link bridging handler circuit electrically coupled to the master transmission circuit and the slave transmission circuit;
   wherein the direct channel is selected under a default passive mode, such that the direct path is directly electrically coupled to the display receiving apparatus and the display transmitting apparatus, and the snooping link bridging handler circuit is enabled to monitor a display data transmission on the direct path through the snooper circuit, so as to perform a channel link bridging process corresponding to a data enhancement transmission channel accordingly;
   when the channel link bridging process under the passive mode fails, the indirect channel is selected under an active mode, such that the master path and the slave path are respectively electrically coupled to the display receiving apparatus and the display transmitting apparatus, and the intervening link bridging handler circuit is enabled to access the display data transmission on the master path and the slave path respectively through the master transmission circuit and the slave transmission circuit, so as to perform the channel link bridging process.

2. The signal enhancement relay apparatus of claim 1, further comprising:
   a first selection circuit configured to select the direct channel to be electrically coupled to the display receiving apparatus through the direct path under the passive mode, and select the indirect channel to be electrically coupled to the display receiving apparatus through the master path under the active mode; and
   a second selection circuit configured to select the direct channel to be electrically coupled to the display transmitting apparatus through the direct path under the passive mode, and select the indirect channel to be electrically coupled to the display transmitting apparatus through the slave path under the active mode.

3. The signal enhancement relay apparatus of claim 2, further comprising a mode switching circuit configured to generate a mode switching signal, such that the snooping link bridging handler circuit, the intervening link bridging handler circuit, the first selection circuit and the second selection circuit operates under one of the passive mode and the active mode.

4. The signal enhancement relay apparatus of claim 1, wherein the channel link bridging process comprises a link training process and an authentication handshaking process, wherein the channel link bridging process is determined to be failed when one of the link training process and the authentication handshaking process fails.

5. The signal enhancement relay apparatus of claim 4, wherein when the link training process is not finished within a predetermined time, or when the link training process is finished at a negotiated mode having a negotiated speed lower than a speed of a supported mode of the display receiving apparatus, the link training process is determined to be failed.

6. The signal enhancement relay apparatus of claim 4, wherein when the authentication handshaking process is not finished within a predetermined time, or when a key authentication fails, the authentication handshaking process is determined to be failed.

7. The signal enhancement relay apparatus of claim 1, wherein the data enhancement transmission channel comprises:
   a receiving circuit electrically coupled to the display transmitting apparatus;
   a transmitting circuit electrically coupled to the display receiving apparatus; and
   a data enhancement circuit configured to perform data enhancement on data transmitted between the receiving circuit and the transmitting circuit when the channel link bridging process is finished.

8. The signal enhancement relay apparatus of claim 7, wherein the snooping link bridging handler circuit comprises:
   a link bridging control circuit configured to monitor the display data transmission on the direct path through the snooper circuit, to control the receiving circuit and the transmitting circuit to perform a link training process with the display transmitting apparatus and the display receiving apparatus; and
   an authentication monitoring circuit configured to monitor an authentication status according to the display data transmission, such that the link bridging control circuit determines whether an authentication handshaking process is finished according to the authentication status.

9. The signal enhancement relay apparatus of claim 7, wherein the intervening link bridging handler circuit comprises:
   a link coordination circuit configured to access the display data transmission on the slave path and the master path through the slave transmission circuit and the master transmission circuit respectively, to control the receiving circuit and the transmitting circuit to perform a link training process with the display transmitting apparatus and the display receiving apparatus, wherein the link training process comprises at least one of:

coordinating link speeds respectively negotiated with the display transmitting apparatus and the display receiving apparatus, adjusting a feed-forward equalizer parameter of the transmitting circuit and transmitting a request to a display transmitting circuit of the display transmitting apparatus to adjust a display transmitting feed-forward equalizer parameter of the display transmitting circuit; and an authentication synchronization circuit configured to access the display data transmission slave path and the master path respectively through the slave transmission circuit and the master transmission circuit, to perform an authentication handshaking process with the display transmitting apparatus and the display receiving apparatus synchronously.

10. A signal enhancement relay method used in a signal enhancement relay apparatus, wherein the signal enhancement relay apparatus is configured to link a display receiving apparatus and a display transmitting apparatus, the signal enhancement relay method comprising:

selecting a direct channel of a display data channel stretching circuit to be electrically coupled to the display receiving apparatus and the display transmitting apparatus under a default passive mode, wherein the direct channel comprises a direct path directly electrically coupled to the display receiving apparatus and the display transmitting apparatus and a snooper circuit electrically coupled to the direct path;

enabling a snooping link bridging handler circuit electrically coupled to the snooper circuit under the passive mode, to monitor a display data transmission on the direct path through the snooper circuit, so as to perform a channel link bridging process corresponding to a data enhancement transmission channel accordingly;

determining whether the channel link bridging process under the passive mode fails;

selecting an indirect channel of the display data channel stretching circuit to be electrically coupled to the display receiving apparatus and the display transmitting apparatus under an active mode when the channel link bridging process under the passive mode fails, wherein the indirect channel comprises a master path electrically coupled to the display receiving apparatus and having a master transmission circuit disposed thereon, and a slave path electrically coupled to the display transmitting apparatus and having a slave transmission circuit disposed thereon; and enabling an intervening link bridging handler circuit electrically coupled to the master transmission circuit and the slave transmission circuit under the active mode, to access the display data transmission on the master path and the slave path respectively through the master transmission circuit and the slave transmission circuit, so as to perform the channel link bridging process.

11. The signal enhancement relay method of claim 10, further comprising:

selecting the direct channel to be electrically coupled to the display receiving apparatus through the direct path under the passive mode, and selecting the indirect channel to be electrically coupled to the display receiving apparatus through the master path under the active mode by a first selection circuit of the signal enhancement relay apparatus; and selecting the direct channel to be electrically coupled to the display transmitting apparatus through the direct path under the passive mode, and selecting the indirect channel to be electrically coupled to the display transmitting apparatus through the slave path under the active mode by a second selection circuit of the signal enhancement relay apparatus.

12. The signal enhancement relay method of claim 11, further comprising:

generating a mode switching signal by a mode switching circuit comprised in the signal enhancement relay apparatus, such that the snooping link bridging handler circuit, the intervening link bridging handler circuit the first selection circuit and the second selection circuit operates under one of the passive mode and the active mode.

13. The signal enhancement relay method of claim 10, wherein the channel link bridging process comprises a link training process and an authentication handshaking process, wherein the channel link bridging process is determined to be failed when one of the link training process and the authentication handshaking process fails.

14. The signal enhancement relay method of claim 13, wherein when the link training process is not finished within a predetermined time, or when the link training process is finished at a negotiated mode having a negotiated speed lower than a speed of a supported mode of the display receiving apparatus, the link training process is determined to be failed.

15. The signal enhancement relay method of claim 13, wherein when the authentication handshaking process is not finished within a predetermined time, or when a key authentication fails, the authentication handshaking process is determined to be failed.

16. The signal enhancement relay method of claim 10, wherein the data enhancement transmission channel comprises:

a receiving circuit electrically coupled to the display transmitting apparatus;

a transmitting circuit electrically coupled to the display receiving apparatus; and a data enhancement circuit configured to perform data enhancement on data transmitted between the receiving circuit and the transmitting circuit when the channel link bridging process is finished.

17. The signal enhancement relay method of claim 16, further comprising:

monitoring the display data transmission on the direct path through the snooper circuit by a link bridging control circuit of the snooping link bridging handler circuit, to control the receiving circuit and the transmitting circuit to perform a link training process with the display transmitting apparatus and the display receiving apparatus; and monitoring an authentication status according to the display data transmission by an authentication monitoring circuit, such that the link bridging control circuit determines whether an authentication handshaking process is finished according to the authentication status.

18. The signal enhancement relay method of claim 16, further comprising:

accessing the display data transmission on the slave path and the master path through the slave transmission circuit and the master transmission circuit respectively by a link coordination circuit of the intervening link bridging handler circuit, to control the receiving circuit and the transmitting circuit to perform a link training process with the display transmitting apparatus and the display receiving apparatus, wherein the link training process comprises at least one of:

coordinating link speeds respectively negotiated with the display transmitting apparatus and the display receiving apparatus, adjusting a feed-forward equalizer parameter of the transmitting circuit and transmitting a request to a display transmitting circuit of the display transmitting apparatus to adjust a display transmitting feed-forward equalizer parameter of the display transmitting circuit; and accessing the display data transmission slave path and the master path respectively through the slave transmission circuit and the master transmission circuit by an authentication synchronization circuit of the intervening link bridging handler circuit, to perform an authentication handshaking process with the display transmitting apparatus and the display receiving apparatus synchronously.

\* \* \* \* \*